United States Patent [19]

Paradise

[11] Patent Number: 4,897,620

[45] Date of Patent: Jan. 30, 1990

[54] CONTINUOUS PHASE SHIFT MODULATION SYSTEM WITH IMPROVED SPECTRUM CONTROL

[75] Inventor: Ronald Y. Paradise, Hillsdale, N.J.

[73] Assignee: Plessey Electronic Systems Corp., Wayne, N.J.

[21] Appl. No.: 319,100

[22] Filed: Mar. 6, 1989

[51] Int. Cl.[4] ...................... H04L 27/12; H04L 27/20
[52] U.S. Cl. .................................... 332/100; 332/103; 375/47; 375/64
[58] Field of Search ................. 332/9 R, 16 R, 18, 22, 332/23 R, 100, 101, 102, 103, 104, 105; 375/47, 64

[56] References Cited

U.S. PATENT DOCUMENTS 4,516,087  5/1985  Bruene .............................. 375/47 X

OTHER PUBLICATIONS

Nakajima et al, "Gaussian Filtered and Amplitude Limited MSK", Transactions of the IECE of Japan, vol. E64, No. 11, Nov. 1981, pp. 716-723.

F. Amoroso, "Pulse Spectrum Manipulation in MSK Format", IEEE Trans. Commun., Mar. 1976, pp. 381-384.

F. Amoroso, "The Use of Quasi-Bandlimited Pulses in MSK Transmission", IEEE Trans. Commun., Oct. 1979, pp. 1616-1624.

Primary Examiner—Siegfried H. Grimm
Attorney, Agent, or Firm—David L. Davis

[57] ABSTRACT

A continuous phase shift modulation system wherein, for each of the in-phase and quadrature components, adjacent half-cosine pulses of the same polarity are joined by a continuous transition modulation signal which maintains continuity of the waveform and at least its first derivative. When this occurs, the other component signal is adjusted to maintain constant the vector sum of the component signals.

7 Claims, 3 Drawing Sheets

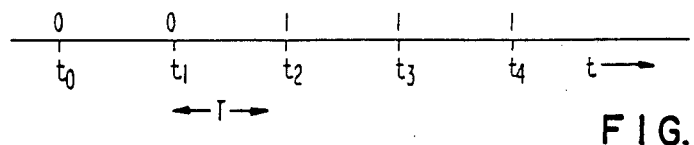
FIG. IA
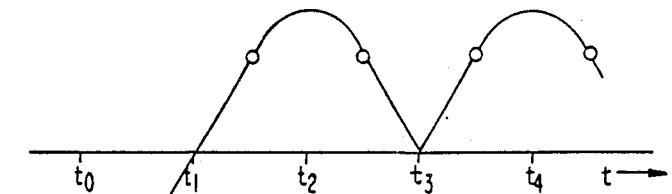
FIG. IB
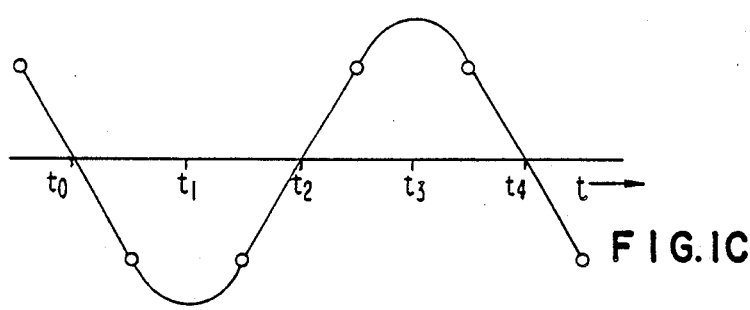
FIG. IC
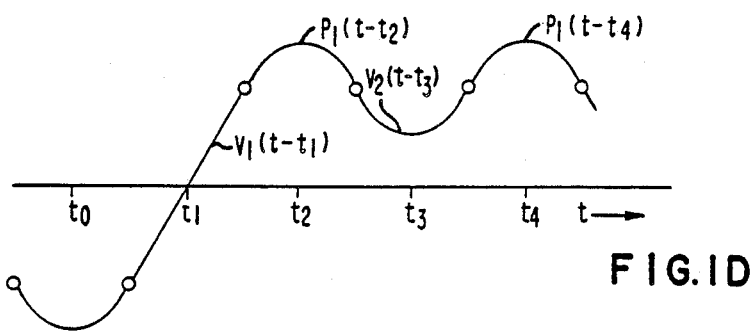
FIG. ID
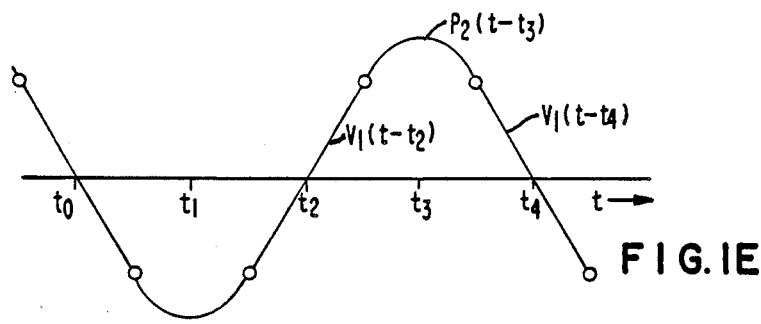
FIG. IE

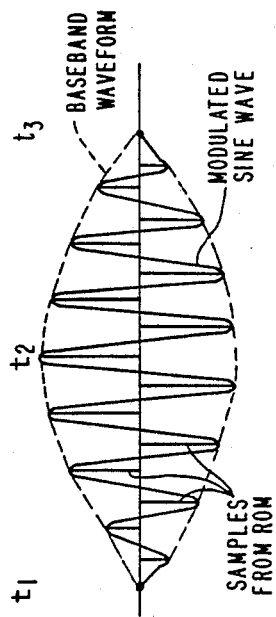
FIG. 2
$$P_1(t) = \begin{cases} 0 & ; |t| > T/2 \\ \cos(\frac{\pi}{2} \cdot \frac{t}{T}) & ; |t| \leq T/2 \end{cases}$$
$$P_2(t) = \begin{cases} 0 & ; |t| > T/2 \\ \sqrt{1-(V_2(t))^2} & ; |t| \leq T/2 \end{cases}$$
$$V_1(t) = \begin{cases} 0 & ; |t| > T/2 \\ \sin(\frac{\pi}{2} \cdot \frac{t}{T}) & ; |t| \leq T/2 \end{cases}$$
$$V_2(t) = \begin{cases} 0 & ; |t| > T/2 \\ \sqrt{2-\cos(\frac{\pi}{2} \cdot \frac{t}{T})} & ; |t| \leq T/2 \end{cases}$$
FIG. 4
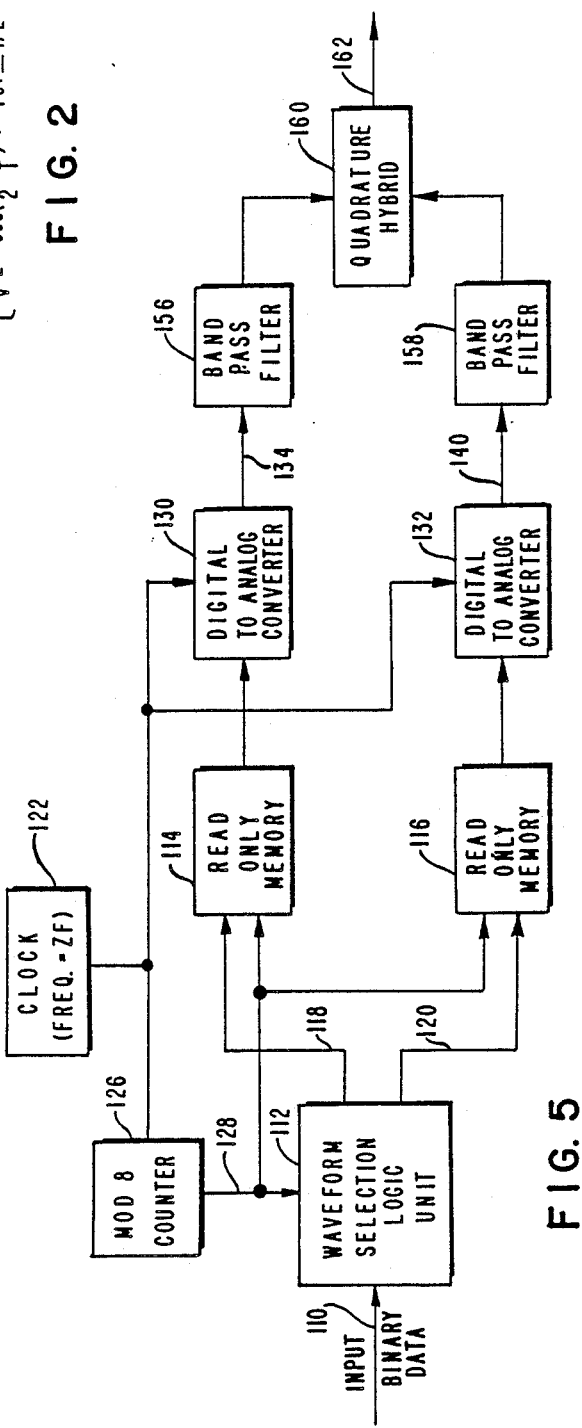
FIG. 5

CONTINUOUS PHASE SHIFT MODULATION SYSTEM WITH IMPROVED SPECTRUM CONTROL

BACKGROUND OF THE INVENTION

This invention relates to data communication systems and, more particularly, to continuous phase shift modulation systems.

Continuous phase shift modulation (sometimes referred to as minimum frequency shift keying) is a known and commonly used technique for modulating digital data onto a radio frequency carrier wave for transmission and subsequent reception. The baseband representation of a continuous phase shift modulation signal is comprised of an in-phase and a quadrature component, each of which is composed of a continuous sequence of half-cosine pulses of varying polarities. The quadrature pulses are time offset from the in-phase pulses by 90°, so that the resulting vector sum amplitude is a constant. An advantageous result of this technique is that the modulation affects only the phase of the carrier signal and not the amplitude. This allows for the use of highly non-linear radio frequency transmitter power amplifiers, thereby reducing cost and size and increasing efficiency.

In order to facilitate the explanation that follows, the logical relationship between incoming data bits and the in-phase and quadrature pulses has been simplified from that usually employed in practice. This simplification is only for descriptive purposes and is not intended to limit the scope of this invention.

In a continuous phase shift modulation system, the polarity of each in-phase pulse is determined by successive even incoming data bits and the polarity of each quadrature pulse is determined by successive odd incoming data bits. Accordingly, when successive alternate incoming data bits have the same value, adjacent half-cosine pulses in a component will have the same polarity. This results in a sharp discontinuity at the juncture between these two adjacent pulses. The discontinuity is rich in high frequency components, resulting in spectrum spreading, which is an undesirable attribute. It is known that filtering can improve spectral roll off, but filtering introduces amplitude modulation which then requires hard limiting as a final operation to re-establish the constant amplitude characteristic of the original continuous phase shift modulation signal. However, the use of limiters introduces excessive complexity and cost, and even then it is difficult to achieve adequate limiter performance.

It is therefore an object of the present invention to provide improved spectrum control in a continuous phase shift modulation system.

It is another object of this invention to provide such improved spectrum control while strictly maintaining the constant amplitude characteristic of the signal, thereby eliminating the need for hard limiting.

SUMMARY OF THE INVENTION

The foregoing and additional objects are attained by providing an improved modulation technique for a continuous phase shift modulation system. The inventive method comprises the step of determining in advance for each of the in-phase and quadrature components whether successive pulses are to have the same or different polarity. If successive pulses in a component are to have the same polarity, a continuous transition modulation signal between the successive pulses is provided in place of adjacent portions of the successive half-cosine pulses. The modulation signal of the other component is then adjusted during the time of the continuous transition modulation signal so as to maintain the desirable constant amplitude characteristic.

In accordance with an aspect of this invention, a system for implementing the inventive method includes a storage device for storing a plurality of modulation signal segments which are selectively retrieved for modulating the carrier after determining whether successive pulses are to have like or different polarity.

BRIEF DESCRIPTION OF THE DRAWINGS

The foregoing will be more readily apparent upon reading the following description in conjunction with the drawings wherein:

FIGS. 1A–1E illustrate a sequence of binary data bits and modulation signal waveforms useful in understanding this invention;

FIG. 2 is a table of formulas for generating modulation signal segments in accordance with this invention;

FIG. 4 is a waveform for an alternate embodiment of this invention; and

FIG. 5 is a block diagram of an illustrative arrangement for implementing the alternate embodiment of this invention.

DETAILED DESCRIPTION

Figure 3:
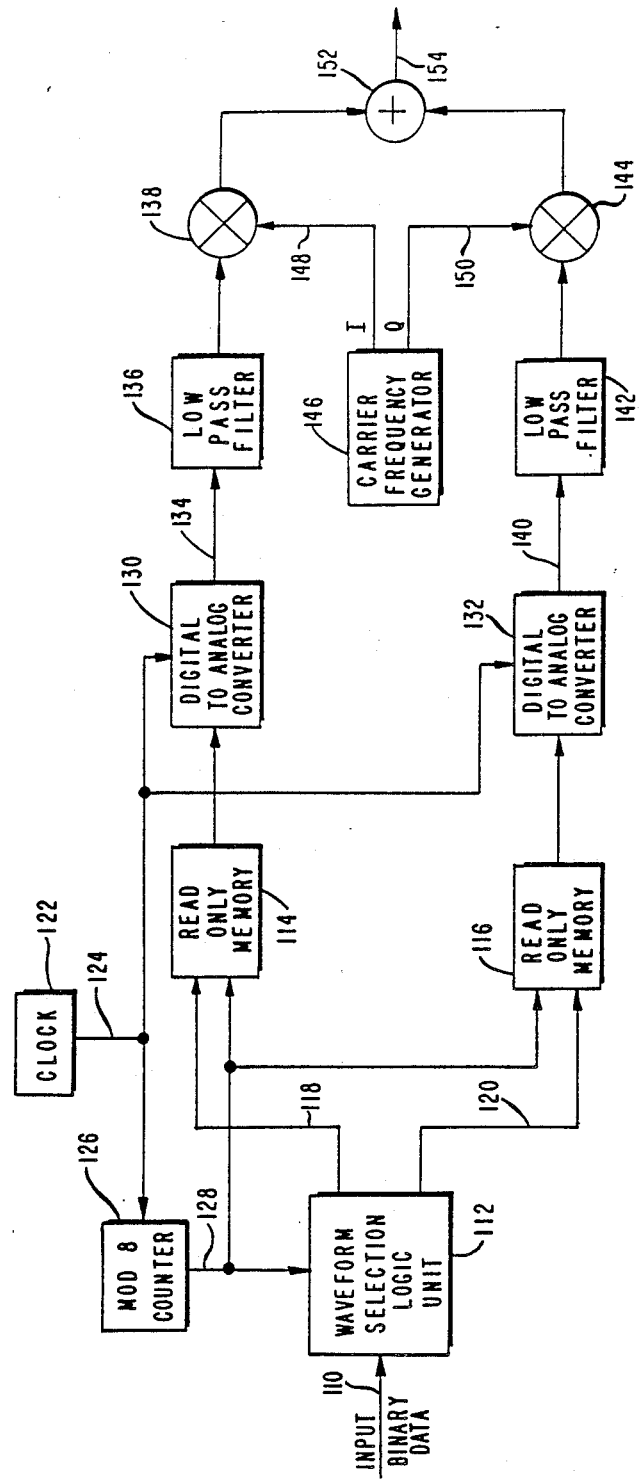
FIG. 3 is a block diagram of an illustrative arrangement for implementing this invention.

Referring now to the drawings, FIG. 1A illustrates an exemplary sequence of binary data bits spaced at a fixed time interval T. Thus, at time $t_0$ there is a data bit of binary value 0; at time $t_1$ there is a data bit of binary value 0; at time $t_2$ there is a data bit of binary value 1; at time $t_3$ there is a data bit of binary value 1; at time $t_4$ there is a data bit of binary value 1; etc. The times $t_0$, $t_1$, $t_2$, etc, are separated by a time interval T.

As discussed above, in a continuous phase shift modulation system, the modulation signal includes an in-phase and a quadrature component, each of which is composed of a continuous sequence of half-cosine pulses of varying polarities. The polarity of each in-phase pulse is determined by successive even incoming data bits and the polarity of each quadrature pulse is determined by successive odd incoming data bits. FIG. 1B illustrates a conventional in-phase component of a continuous phase shift modulation signal based upon the sequence of data bits shown in FIG. 1A, and FIG. 1C illustrates the corresponding conventional quadrature component of a continuous phase shift modulation signal based upon the sequence of data bits shown in FIG. 1A. Thus, as shown in FIG. 1B, since the data bit at the time $t_0$ has the binary value 0, the half-cosine pulse in the in-phase signal surrounding the time $t_0$ is negative. Since the data bits at the times $t_2$ and $t_4$ both have the binary value 1, the half-cosine pulses surrounding the times $t_2$ and $t_4$ in the in-phase signal are both positive. Similarly, looking at the quadrature component signal illustrated in FIG. 1C, the half-cosine pulse surrounding the time $t_1$ is negative because the binary value of the data bit at the time $t_1$ is 0; and the half-cosine pulse surrounding the time $t_3$ is positive because the binary value of the data bit at the time $t_3$ is 1. The in-phase and quadrature component signals satisfy the condition that at any given time, their vector sum is a constant. In other words, the sum of the squares of the component signal values is constant. The undesirable attribute of spectrum spreading which the present invention seeks to overcome occurs at the juncture of the two positive half-cosine pulses in the in-phase component illustrated in FIG. 1B.

In accordance with the principles of this invention, in place of the conventional continuous phase shift modulation sharp V-like discontinuity shown in FIG. 1B at time $t_3$, the continuous transition bridging waveform shown in FIG. 1D is utilized in the region $t_3 \pm \frac{1}{2}T$. Illustratively, this bridging function is the previous $\pm 45°$ cosine segment inverted and biased to retain continuity of the waveform and its first derivative. In order to maintain constant the vector sum amplitude of the in-phase and quadrature components, the quadrature component signal illustrated in FIG. 1E must be modified within the time interval $t_3 \pm \frac{1}{2}T$ to compensate for the increased value of the in-phase component signal during this time interval. Thus, the value of the quadrature component signal during that time interval is chosen to be the square root of the vector sum amplitude squared less the in-phase component value squared. For the purposes of further discussion, the vector sum amplitude will be considered to be unity.

FIG. 2 is a table showing illustrative formulas for generating the in-phase and quadrature component modulation signal segments according to this invention. In that table, the formulas with the subscript 1 relate to the unmodified waveform segments, whereas those with the subscript 2 relate to the modified waveform segments. According to the present invention, the appropriate next waveform segment for the in-phase and quadrature components must be selected and generated at each 45° point, i.e., at $t=t_i-\frac{1}{2}T$ for the ith bit. At these points, the waveform amplitude will always be $\pm \cos 45° = \pm 0.707$. A total of eight waveform segments are required, the unmodified peak and valley waveform segments $P_1$ and $V_1$, the modified peak and valley waveform segments $P_2$ and $V_2$, and the corresponding negative values of each. These waveform segments satisfy the condition that at any given time $P_1^2 + V_1^2 = 1$ and $P_2^2 + V_2^2 = 1$. Which P (peak) waveform is chosen is dependent upon selection of the appropriate V (valley) waveform. Thus, for a particular signal component, if two successive pulses have the same polarity, then a $V_2$ waveform is chosen as a continuous transition bridging segment. This dictates that a $P_2$ waveform be chosen for the other component during that time interval.

FIG. 3 is a block diagram showing an illustrative system implementing this invention. As shown therein, the input sequence of binary data bits is received over the lead 110 and applied as an input to the waveform selection logic unit 112 The function of the waveform selection logic unit 112 is to examine the sequence appearing on the lead 110, divide this sequence into two subsequences of the alternate bits, one for each of the in-phase and quadrature component signals to be generated, and determine within each of these subsequences whether successive data bits have the same or different values. Read only memory 114 and read only memory 116 are provided for storing data to reconstruct the waveform signal segments for the in-phase and quadrature component signals. Illustratively, the read only memories 114 and 116 are identical since the formulas for the component waveform signal segments are the same (see FIG. 2), and each of the waveform signal segments is stored as eight samples, with each sample being represented by an eight bit word of memory. The eight words for each of the waveform signal segments are stored in successive addressable locations. Accordingly, when it is desired to retrieve one of the signal segments, the address of the first sample word is developed and then that word and the next seven words are accessed.

Accordingly, the waveform selection logic unit 112 determines which segments are to be retrieved from the read only memory 114 and the read only memory 116 and provides on the leads 118 and 120 the addresses of the first sample word of the desired segments. A clock 122 is provided which places a clock signal on its output 124 at a frequency corresponding to the frequency of the input sequence of binary data on the lead 110 times the number of samples per waveform segment (eight times in this example). Thus, the clock 122 operates at a frequency of $8/T$. The clock signal on the lead 124 is provided as a synchronizing input to the modulus eight counter 126 which divides the interval T into eight equal subintervals. The output of the counter 126 on the lead 128 is utilized by the logic unit 112 and the read only memories 114 and 116 to step through the remaining sample words of the selected segments after the addresses of the first sample words of the segments are applied to the leads 118 and 120.

The timing of the selection and generation of the segments is as follows. For bit i, prior to $t_i-\frac{1}{2}T$, the logic unit 112 chooses the next in-phase and quadrature component waveforms and at time $t_i-\frac{1}{2}T$ places an address on the leads 118 to the read only memory 114 and places an address on the leads 120 to the read only memory 116. The counter 126 then steps through the eight sequential words of the waveform samples, before the process repeats beginning at time $t_i+\frac{1}{2}T=t_{i+1}-\frac{1}{2}T$.

The output of the read only memory 114 is provided as an input to the digital to analog converter 130 and the output of the read only memory 116 is provided as an input to the digital to analog converter 132. The converter 30 takes each eight bit sample word and converts it to an analog signal on the lead 134, which is applied to low pass filter 136. The low pass filter 136 receives the sequence of analog signals on the lead 134 and provides therefrom a smoothed waveform signal. The smoothed waveform signal is then applied to multiplier 138. The multiplier 138 can be implemented with a conventional RF mixer component. Similarly, the analog signal output of converter 132 on the lead 140 is applied to low pass filter 142 and then to multiplier 144. The outputs of the filters 136 and 142 correspond to the waveforms shown in FIG. 1D and 1E, respectively.

Carrier frequency signal generator 146 generates the radio frequency carrier signal and provides an in-phase component of that signal on the lead 148 having a relative phase of 0° and a quadrature component of that signal on the lead 150 having a relative phase of 90°. The in-phase component on the lead 148 is applied as an input to the multiplier 138, where it is multiplied by the in-phase modulation signal output of the low pass filter 136. Similarly, the quadrature component on the lead 150 is multiplied by the quadrature modulation signal output of the filter 142. The modulated carrier component signals are then applied as inputs to the adder 152, whose output on the lead 154 is the continuous phase shift modulation output.

Although a cosine function for the bridging segment $V_2$ has been disclosed, other functions are possible. The cosine function disclosed in FIG. 2 provides continuity of the signal and its first derivative. If it were desired to have in addition a continuous second derivative, a quartic polynomial of the form:

$V_2(a) = -0.3257a^4 + 0.852a^2 + 0.3055$ for $|a| < \#/4$;
where $a = (\pi/2)(t/T)$ could be utilized.

More generally, various $V_2$ functions can be constructed which provide continuity up to the Nth derivative. As N increases, the rate of frequency spectrum rolloff at high frequencies increases. In this way, the spectrum can be optimized to meet desired performance characteristics.

As an alternative to the generation of the final RF waveform by means of RF carrier frequency generator 146 and multipliers 138 and 144 as previously described, the modulated signal on the lead 154 can be generated more directly by use of high speed read only memories and digital to analog converters.

To generate modulated carriers at a desired center frequency F, each read only memory is accessed at a rate of 2F with successive outputs alternating between positive and negative values. The magnitude of these samples should be chosen to be the appropriate stored time samples of the desired waveform segments as described previously from the waveform selection process. These samples are supplied to a digital to analog converter and its output in turn is provided to a bandpass filter centered at frequency F to generate a modulated carrier similar to the output of mixer 138 in FIG. 3. A similar process is used in the lower channel for the quadrature signal. Although a rate of 2F has been described, it is possible to access the memory at a rate which is a multiple of 2F. In this case, there would be a number of successive outputs of the same polarity alternating with that number of successive outputs of the opposite polarity, the number being equal to the multiple of 2F of the sampling rate.

FIG. 4 illustrates this approach for the waveform corresponding to the portion of the baseband waveform in FIG. 1B between the times $t_1$ and $t_3$. The vertical lines represent the samples accessed from the read only memory and the modulated sine wave shows the output of the digital to analog converter after it has been passed through a bandpass filter centered at the desired frequency F. For this illustrative example, there are eight samples per bit interval T and the frequency F is $\frac{1}{2}$T. However, in a practical application, the frequency F would be many times greater than the bit rate.

FIG. 5 illustrates an implementation of this alternate approach. The digital hardware through the digital to analog converters is identical to FIG. 3 except for the values stored in the read only memories and the frequency of the clock. The outputs of the converters 130 and 132 are applied to bandpass filters 156 and 158, respectively. To accomplish the 90° phase shift between the in-phase and quadrature channels, the outputs of the filters 156 and 158 are combined by means of a quadrature hybrid circuit 160. This is a conventional RF component which performs a 90° relative phase shift between the two input signals and provides as its output on the lead 162 the sum of these two components. The output 162 of the quadrature hybrid circuit 160 is equivalent to lead 154 of FIG. 3.

The desired phase relationship can also be accomplished without the quadrature hybrid circuit 160 by offsetting the digital clock phases of the quadrature channel to delay the output of the digital to analog converter 132 by the equivalent of 90°. The simple addition of the two channel outputs will then provide the desired final output without the need for the quadrature hybrid circuit 160.

Accordingly, there has been disclosed a continuous phase shift modulation system with improved spectrum control. The improved spectrum control results from the elimination of the sharp discontinuity at the juncture between adjacent pulses of the same polarity. It is understood that the above-described embodiments are merely illustrative of the application of the principles of this invention. Numerous other embodiments may be devised by those skilled in the art without departing from the spirit and scope of this invention, as defined by the appended claims

I claim:

1. In a continuous phase shift modulation system wherein a sequence of binary data bits is converted into a waveform having an in-phase component and a quadrature component, each of said components comprising a carrier frequency modulated by half-cosine pulses of polarity determined by the value of alternate bits in the sequence and wherein at any given time the vector sum of the in-phase and quadrature components equals a constant value, the method comprising the steps of:
    (a) determining in advance for each component whether successive pulses are to have the same or different polarity;
    (b) if successive pulses in a component are to have the same polarity, providing a continuous transition modulation signal between the successive pulses in place of adjacent portions of the successive half-cosine pulses, said continuous transition modulation signal being a signal in the form of the preceding cosine segment inverted and biased to maintain continuity of the waveform and its first derivative; and
    (c) adjusting the modulation signal of the other component during the time of the continuous transition modulation signal to maintain constant the vector sum of the component signals.

2. A continuous phase shift modulation system for converting a sequence of binary data bits into a waveform having an in-phase component and a quadrature component, each of said components comprising a carrier frequency modulated by half-cosine pulses of polarity determined by the value of alternate bits in the sequence, at any given time the sum of the squares of the values of the components being equal to a constant value, the system comprising:
    means for receiving incoming data in the form of a sequence of binary data bits spaced at a fixed interval;
    means for examining said sequence to determine for successive alternate data bits whether they have the same or different value;
    means for storing a plurality of modulation signal segments, said segments being divided into a plurality of groups, one of said groups corresponding to the situation where successive alternate data bits have the same value, another of said groups corresponding to the situation where successive alternate data bits have different values, said one group including a valley signal segment which provides a continuous modulation signal in the transition valley region between successive pulses of like polarity and a peak signal segment having a value at any given time which is equal to the square root of the constant value less the square of the valley signal segment value at that time;

means responsive to the determination of said examining means for selectively retrieving from said storing means a sequence of modulation signal segments from said one group when successive alternate data bits have the same value and a sequence of modulation signal segments from said another group when successive alternate data bits have different values;

means utilizing the retrieved sequence of modulation signal segments for generating said components of said waveform; and means for combining said components into an output signal.

3. The system according to claim 2 wherein each of said modulation signal segments is divided into a plurality of samples each represented by a binary word and said storing means includes a read only memory storing the words in addressable locations.

4. the system according to claim 3 wherein said utilizing means includes:

digital to analog converting means coupled to the output of said storing means for converting the sequence of binary words to a sequence of analog signals; and bandpass filter means coupled to receive said analog signals for providing a smoothed waveform signal from said analog signal sequence.

5. The system according to claim 4 wherein said combining means includes a quadrature hybrid circuit coupled to receive as inputs said waveform components.

6. The system according to claim 4 wherein said combining means includes means for delaying the output of one of said digital to analog converting means by the equivalent of a 90° phase shift.

7. In a continuous phase shift modulation system wherein a sequence of binary data bits is converted into a waveform having an in-phase component and a quadrature component, each of said components comprising a carrier frequency modulated by half-cosine pulses of polarity determined by the value of alternate bits in the sequence and wherein at any given time the vector sum of the in-phase and quadrature components equals a constant value, the method comprising the steps of:

(a) determining in advance for each component whether successive pulses are to have the same or different polarity;

(b) if successive pulses in a component are to have the same polarity, providing a continuous transition modulation signal between the successive pules in place of adjacent portions of the successive half-cosine pulses, said continuous transition modulation signal being a signal in the form of a quartic polynomial which maintains continuity of the waveform and its first and second derivatives; and (c) adjusting the modulation signal of the other component during the time of the continuous transition modulation signal to maintain constant the vector sum of the component signals.

* * * * *